United States Patent

[11] 3,625,421

| [72] | Inventor | James L. Garrison<br>Hatboro, Pa. |
|---|---|---|
| [21] | Appl. No. | 29,587 |
| [22] | Filed | Apr. 17, 1970 |
| [45] | Patented | Dec. 7, 1971 |
| [73] | Assignee | Leeds & Northrup Company<br>Philadelphia, Pa. |

[54] SYSTEM FOR CONTROLLING FURNACE TEMPERATURES WITHOUT OVERSHOOT
6 Claims, 2 Drawing Figs.

[52] U.S. Cl..................................................... 236/15 B,
219/516, 263/52, 236/78, 318/641
[51] Int. Cl..........................................G05b11/32,
G05d 23/22
[50] Field of Search........................................ 236/156,
786, 78 C; 263/52; 219/516; 318/639, 609, 641;
317/133.5

[56] References Cited
UNITED STATES PATENTS

| 3,447,790 | 6/1969 | Ross et al...................... | 263/28 |
| 3,266,725 | 8/1966 | Garrison et al. .............. | 236/15 B |
| 3,050,256 | 8/1962 | Fuller........................... | 236/15 B |
| 3,212,709 | 10/1965 | Hanssen ...................... | 236/15 |

*Primary Examiner*—William E. Wayner
*Attorneys*—William G. Miller, Jr. and Raymond F. MacKay ABSTRACT: A temperature control system for an annealing furnace which controls to maintain a weighted average of the furnace temperature and the work temperature equal to the desired work temperature. The weighting of the average is such that the maintenance of the average in equality with the desired work temperature operates to maintain the furnace temperature so related to the work temperature as to provide an optimum heating rate for the avoidance of overshoot.

FIG. 1
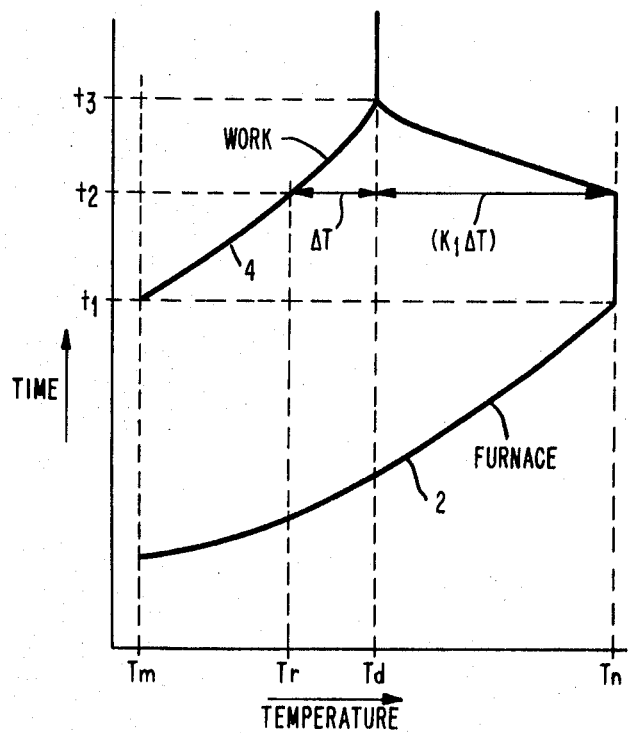
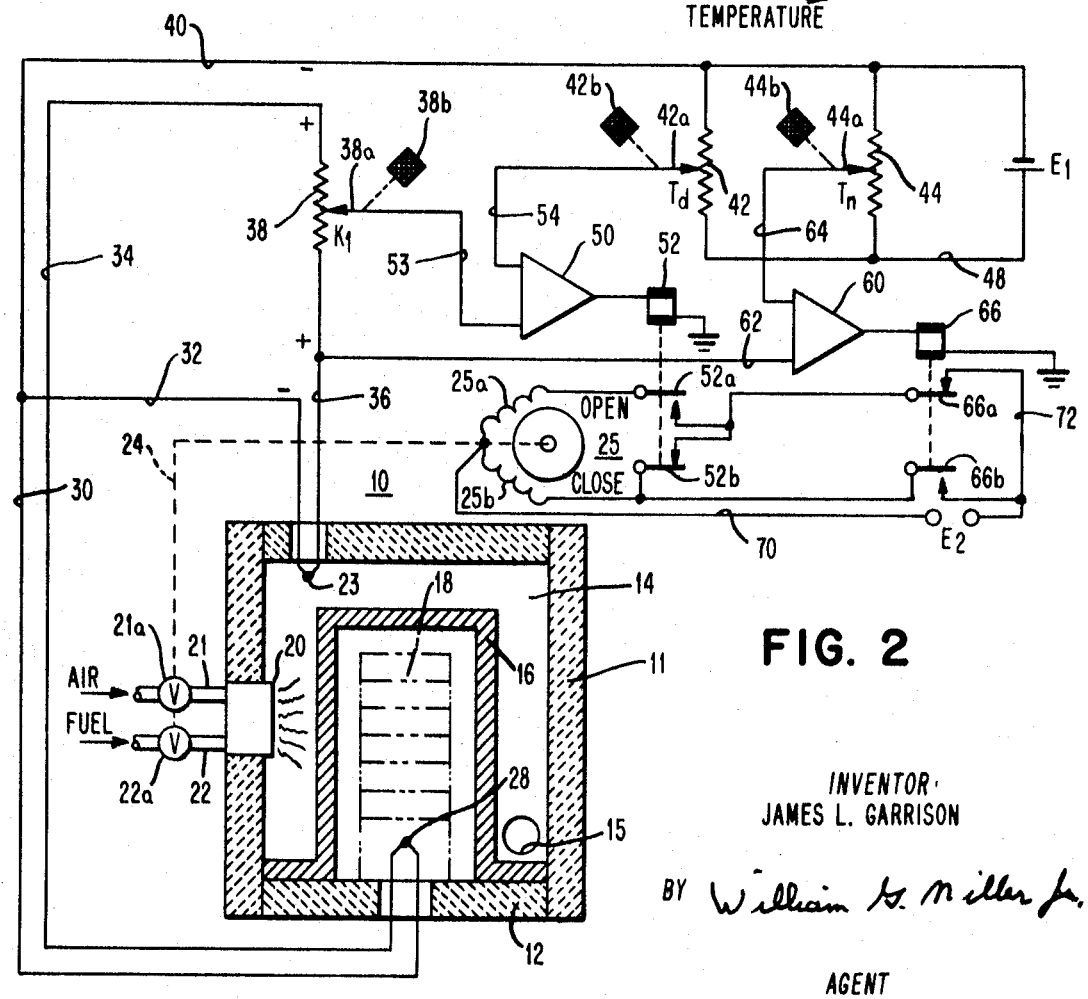
FIG. 2
INVENTOR·
JAMES L. GARRISON
BY William G. Miller Jr.
AGENT 3,625,421

SYSTEM FOR CONTROLLING FURNACE TEMPERATURES WITHOUT OVERSHOOT

BACKGROUND OF THE INVENTION

This invention relates to a control system for furnaces and more particularly to a control system for annealing furnaces such as those used for annealing coils of metal stock wherein the heating of the stock tends to lag behind the supply of heat to the furnace itself.

Prior control systems such as that disclosed in U.S. Pat. No. 3,266,725, which issued on Aug. 16, 1966 to the present inventor and a coworker of his, have required apparatus which is more complicated and expensive than that set forth in the present disclosure. Another control system for carrying out control of the type here disclosed but which requires more complicated apparatus is also disclosed in U.S. Pat. No. 3,447,790 issued to R. H. Ross et al. on June 3, 1969.

SUMMARY OF THE INVENTION

In carrying out the invention there is provided apparatus for regulating the heat input to a furnace during a period in which the work therein is being elevated to a desired temperature. That apparatus carries out the steps of measuring the temperature of the work, measuring the temperature of the furnace, automatically calculating a weighted average of the work temperature and the furnace temperature and then automatically comparing the weighted average with the desired work temperature and controlling automatically the heat input to the furnace so as to cause the average to equal the desired work temperature. The average is weighted so that it has a value corresponding to the desired work temperature when the furnace temperature and the work temperature are in the relationship required for the furnace to provide the optimum heat head for the existing work temperature in order to obtain a heating of the furnace without overshoot of the work temperature.

BRIEF DESCRIPTION OF THE DRAWINGS

FIG. 1 is a graphical representation of the relationship which is desired between the furnace temperature and the work temperature in order to bring the work temperature up to its desired value without overshoot.

FIG. 2 is a schematic diagram showing one control circuit which can be used to carry out the invention.

DESCRIPTION OF THE PREFERRED EMBODIMENT

In FIG. 1 there is plotted time-temperature curves showing how the temperature of the annealing furnace is controlled so as to bring the temperature of the work to be annealed to its desired value as rapidly as possible and with a minimum of overshoot.

The curve 2 shows how the furnace temperature varies with time while the curve 4 shows how the work temperature varies with time when the furnace is under control by a system such as that shown in FIG. 2. In the diagram of FIG. 1 it is assumed that the furnace has been in operation for a sufficient period of time for the furnace to arrive at a temperature $T_m$. Normally, during the initial heating of the furnace the maximum amount of heat input is being utilized in order to bring the furnace up to its temperature limit $T_n$ as rapidly as possible. When the furnace temperature reaches its temperature limit, it is maintained at that limit until the work temperature, as plotted along curve 4, reaches a value such that it is necessary to decrease the furnace temperature in order to prevent an overshoot of the work temperature above its desired value, namely the set point $T_d$.

As shown in FIG. 1 when the temperature of the work has risen to the temperature $T_r$ at time $t_2$, the furnace temperature must then be decreased below its maximum.

During a control of the furnace temperature, as it is decreased to prevent an overshoot of the work temperature, it is desirable to maintain a predetermined relationship between the deviation of the work temperature from its set point $T_d$ and the difference between the set point temperature $T_d$ and the furnace temperature so as to maintain an optimum heating of the work by maintaining the heat head of the furnace required to cause the work temperature to arrive at its set point without there being sufficient heat head in the furnace to cause the work temperature to overshoot to any significant degree its desired (set point) value $T_d$.

As shown in FIG. 1, the particular relationship required between the difference between the work temperature and its set point, $\Delta T$, and the difference between the furnace temperature and the work temperature set point is expressed by the ratio $\Delta T/K_1 \Delta T$. It will thus be evident that whenever the deviation of the furnace temperature from the work temperature set point does not have the desired relationship to the deviation of the work temperature from its set point as established by the expression set forth above, it is then required that control action on the heat input to the furnace operate so as to maintain that relationship. A circuit diagram of a control system for carrying out control of the heat input to the furnace in such a way as to maintain that relationship is shown in FIG. 2.

Referring now to FIG. 2 the invention has been disclosed as it can be applied to an annealing furnace 10 having an insulated shell 11 and a base 12 enclosing the firing chamber 14 within which there is disposed a retort 16. The retort may be of a material such as a nickel steel alloy for the transfer of heat to the work 18 which is shown as a stack of rolls of strip metal. With a furnace arrangement such as that shown in FIG. 2 the rolls of strip metal are isolated from the products of combustion during the annealing operation.

Other types of furnace construction are also used for annealing processes. For example, radiant tube heaters are frequently utilized as the source of heat. With such heaters there is no need for the retort 16 as shown in FIG. 2 since the products of combustion are isolated from the metal to be annealed by virtue of the structure of the heaters. In such furnaces there is nevertheless a need for the control system of FIG. 2 due to the considerable lag between the change in temperature of the rolls of strip metal as the temperature of the furnace is increased.

Although the furnace 10 may be elevated in temperature by any suitable heating means, in FIG. 2 there is illustrated a fuel burner 20 which produces within the firing chamber 14 hot products of combustion which after transfer of heat to the retort 16 are withdrawn through flue 15 to a stack (not shown). The burner 20 has an air and fuel supply thereto under the control of regulating valves 21a and 22a which are jointly operable by the mechanical connection 24, shown as a broken line extending to a suitable operating means such as the control motor 25.

In FIG. 2 the temperature of the furnace, which is utilized as being indicative of the heat head of the furnace, is measured by means of a thermocouple 23 which is preferably located in the region of the furnace in which the highest temperature is developed, though not in the flame from the burner. The thermocouple 23 thus produces across its leads 32 and 36 a signal which is herein referred to as the second signal.

A second thermocouple 28 is disposed within the retort 16 at a position indicative of the hottest temperature of the load 18. The potential across the leads 30 and 34 of thermocouple 28 is herein referred to as the first signal. It will, of course, be evident that the temperature of the furnace as detected by the thermocouple 23 will rise much more rapidly than will that of the work 18 as detected by the thermocouple 28.

By reason of the mass of the retort 16 and insulating material 11 forming the furnace there will be stored a considerable amount of heat which will be effective even after the burner 20 has been extinguished to continue to cause a rise in the temperature of the work 18 until an equilibrium condition has been obtained between the temperature in the firing chamber 14 and the temperature of the work 18. It is this storage of heat, which is referred to as the heat head, which causes the temperature of the work to rise above the set point and to thus exceed the desired annealing temperature. Normally, the desired annealing temperature must be closely followed in order to obtain the desired results from the annealing process. An excessive temperature in the annealing process may, for example, cause an undesirable grain structure in the final product.

The negative lead 30 of thermocouple 28 is connected to the negative lead 32 of thermocouple 23 and the positive leads 34 and 36 of thermocouples 28 and 23 are connected to opposite ends of potentiometer 38 whose variable tap 38a is adjusted by knob 38b to establish a value $K_1$ so that the potential at the tap 38a with respect to the negative leads (referred to as the fourth signal) is a weighted average of the temperature measured by thermocouples 23 and 28.

The leads 30 and 32 of the thermocouples 28 and 23 connect to a common conductor 40 which is also connected to one side of a DC potential supply $E_1$ and also to one side of the potentiometers 42 and 44, respectively.

The other side of the potentiometers 42 and 44 are connected by way of lead 48 to the positive side of the DC source $E_1$, which is shown in FIG. 2 as a battery.

The variable tap 42a of potentiometer 42 is adjusted by the knob 42b so as to establish a potential (referred to as the third signal) between the common line 40 and the tap 42a which represents the set point (the desired temperature $T_d$) for the work in the furnace 10.

The variable tap 44a of potentiometer 44 is adjusted by the knob 44b so as to establish a potential between the common conductor 40 and the tap 44a equal to the limit allowing for the furnace temperature, namely $T_n$.

As shown in FIG. 2, the control motor 25 is operated in a direction to open valves 21a and 22a when current flows through the winding 25a and the motor 25 is controlled to close the valves when current flows through the winding 25b.

A null-type detector shown as a relay operating amplifier 50 is effective to energize the relay 52 whenever the potential line 53 from tap 38a is lower than the potential on line 54 from tap 42a. Upon operation of the relay operator 52 the relay contact 52a is closed and the relay contact 52b is opened. The current will thus be allowed to flow through the winding 25a and current will be prevented from flowing through the winding 25b if the furnace is below its temperature limit.

The null detector, shown as a relay operating amplifier 60, is effective to compare the potential on line 62, from the positive side of thermocouple 23 and line 36 with the potential on line 64 which is connected to the tap 44b. Whenever the potential on line 62 exceeds that on line 64 relay operator 66 is energized so as to disconnect the relay contact 66a and make contact 66b. The effect of making the contact 66b is to allow current to flow through the line 25b so as to move the valves 21a and 22a in a direction which will close those valves. The current flow, of course, results from the potential $E_2$ which connects one terminal to line 70 which is in turn connected to the common terminal of windings 25a and 25b. The other terminal of the potential source $E_2$ connects to the common lead 72 which provides the power supply by way of the several relay contacts to the other terminals of the windings 25a and 25b.

In the operation of the circuit of FIG. 2, it will be evident that during the time period up to $t_1$ the furnace temperature has not reached its limit value $T_n$ and the furnace temperature also far exceeds the work temperature, therefore during that period the relay operator 52 will be energized and the relay operator 66 will be deenergized so that the control motor 25 will have opened the valves 21a and 22a by virtue of the current flow from the source $E_2$ through line 72, relay contact 66a, and relay contact 52a as well as the winding 25a and the return line 70.

When the furnace temperature reaches its limit $T_n$ at time $t_1$, the relay operator 66 is energized and the relay contact 66a is disconnected while the contact 66b is made so that the current flow to the control motor 25 is through the winding 25b so as to close the valves 21a and 22a. Those valves will close and open as is necessary to maintain the furnace temperature at its limit $T_n$ during the period $t_1$ to $t_2$.

When the work temperature has reached the point at which the desired furnace temperature becomes less than the limit value $T_n$ such as during the period between $t_2$ and $t_3$, the control of the heat input to the furnace is effected by the operation of the relay operator 52 in accordance with the established desired relationship between the deviation of the furnace temperature from the work temperature set point and the deviation of the work temperature from that set point. For example, it may be desirable in order to maintain the desired heating head in the furnace so as to bring the work up to the desired temperature without overshoot, to have a ratio between the deviation of the work temperature from its set point and the deviation of the furnace temperature from the work temperature set point in a ratio of 1 to 8. With such an arrangement the adjustment of the slider 38a of potentiometer 38 will be such that the upper portion of the resistor of the potentiometer 38 will have a resistance which is ⅛ of that portion of the resistor below the slider 38a.

The adjustment of the contact 42a on potentiometer 42 is such that the potential between the common line 40 and the contact 42a will be equal to the potential produced by the thermocouple 28 when the temperature of the work is at its set point.

The adjustment of the tap 44a on potentiometer 44 is such that the potential between the tap and the common line 40 is equal to the potential which would be obtained from thermocouple 23 when the furnace has reached its limit temperature $T_n$.

It will be evident from the above description that during the period from $t_2$ to $t_3$ the deviation of the work temperature from its set point, $\Delta T$ will be such that the furnace temperature must be decreased below its limit value and the magnitude of the furnace temperature will exceed the set point temperature for the work by an amount $K_1 \Delta T$ as indicated in FIG. 1. This is the optimum relationship and it is maintained by the relay operator 52 in response to the comparison of the potentials on the contacts 38a and 42a. As the work temperature approaches its set point and $\Delta T$ becomes zero, the furnace temperature which is controlled also approaches the work temperature set point thus the potential across the potentiometer 38 becomes zero and the potential appearing on contact 38a is equal to the potential on the plus lead 34 of thermocouple 28.

As previously pointed out, the potential on the contact 38a is compared with that on 42a. Of course, when the potential on contact 38a has reached the value $T_d$, the difference between the potentials on contact 38a and 42a will be zero and the relay operator 52 will be deenergized so as to return the contacts 52a and 52b to the positions as shown in FIG. 2. At the same time, of course, the contacts 66a and 66b will be in their deenergized positions as shown in FIG. 2 and the current path will be available only to the "close" winding 25b of motor 25. The null detector 50 and its associated relay operator 52 will, of course, operate to maintain the work temperature at its set point $T_d$ during the soak period for the work, which may be for a considerable period of time depending upon the type of work being annealed.

What is claimed is:

1. A method for automatically regulating the heat input to a furnace during a period in which the work therein is being elevated to its desired temperature, comprising the steps of measuring the temperature of the work, measuring the temperature of the furnace, automatically calculating a weighted average of the work temperature and the furnace temperature, said average being weighted so that it has a value corresponding to the desired work temperature when the furnace temperature and the work temperature have the predetermined relationship to the desired work temperature required for optimum heating of the work, automatically comparing said weighted average with the desired work temperature, and automatically controlling the heat input to the furnace so as to cause said average to tend to equal the desired work temperature.

2. A method for automatically regulating the heat input to a furnace during a period in which the work therein is being elevated to its desired temperature, comprising the steps of producing a first signal indicative of the temperature of the work, producing a second signal indicative of the temperature of the furnace, producing a third signal indicative of the desired temperature for the work, automatically producing in accordance with the first and second signals a fourth signal representing the weighted average of the first and second signals, the weighting being such that the difference between the first and fourth signals and the difference between the second and fourth signals is the predetermined relationship required when the fourth signal equals the third signal to produce a heating of the work at the maximum rate which can be used while avoiding significant overshoot of the work temperature above its desired value, and automatically controlling the heat input to the furnace in response to the difference between said third and fourth signals so as to cause said third and fourth signals to tend to reach equality.

3. A system for automatically regulating the heat input to a furnace during a period in which the work therein is being elevated to its desired temperature comprising:

means for measuring the temperature of the work, means for measuring the temperature of the furnace, means for automatically calculating a weighted average of the work temperature and the furnace temperature with the weighting being such that the average has a value corresponding to the desired work temperature when the furnace temperature and the work temperature have that predetermined relationship which is required with respect to the desired work temperature for optimum heating of the work, means for automatically comparing said weighted average with the desired work temperature, and means for automatically controlling the heat input to the furnace so as to cause said average to tend to equal the desired work temperature.

4. A system for automatically regulating the heat input to a furnace during a period in which the work therein is being elevated to its desired temperature comprising:

means for producing a first signal indicative of the temperature of the work, means for producing a second signal indicative of the temperature of the furnace, means for producing a third signal indicative of the desired temperature for the work, means for automatically producing in accordance with the first and second signals a fourth signal representing the weighted average of the first and second signals, the weighting being such that the difference between the first and fourth signals and the difference between the second and fourth signals has the predetermined ratio required when the fourth signal equals the third signal to produce a heating of the work at the maximum rate which will avoid significant overshoot, and means for automatically controlling the heat input to the furnace in response to the difference between said third and fourth signals so as to cause said third and fourth signals to tend to reach equality.

5. In a temperature control system for an annealing furnace in which separate temperature detecting elements produce a work temperature signal and a furnace temperature signal and in which a control system maintains the furnace temperature at a point which exceeds the desired work temperature by an amount having a predetermined ratio to the deviation of the work temperature from its desired value as the work temperature approaches its desired value, the improvement comprising:

means for calculating a weighted average between the furnace temperature signal and the work temperature signal, the weighting being in accordance with said predetermined ratio, and means for comparing the weighted average with the desired work temperature to obtain the error signal to which said control responds.

6. A system for automatically regulating the heat input to a furnace during a period in which the work therein is being elevated to its desired temperature comprising;

a thermocouple located so as to produce a first potential difference indicative of the temperature of the work, another thermocouple located so as to produce a second potential difference indicative of the highest temperature in the furnace, a potential source, a potentiometer shunting said source so as to produce at its variable tap a potential with respect to one side of said source which is of value corresponding to that which would be produced by said work thermocouple when the work is at its desired temperature, means connecting leads of said thermocouples which are of common polarity and the side of said source of the same polarity, a potentiometer connecting the other leads of each of the thermocouples and having a variable tap for obtaining at said tap a potential with respect to the connected common leads of the thermocouples a potential indicative of the weighted average of the work and furnace temperatures, the weighting being such that the optimum relationship between work and furnace temperatures, as measured by said thermocouples, exists when the weighted average is equal to the desired work temperature, and means operable in response to the difference between the potential at said last named tap and the potential at the variable tap across said source for modifying the input to the furnace to tend to maintain the temperature of the weighted average at the set value for said work temperature.

* * * * *